C. H. MYERS.
CARBURETER.
APPLICATION FILED MAR. 1, 1912.
1,093,718.
Patented Apr. 21, 1914.
2 SHEETS—SHEET 1.
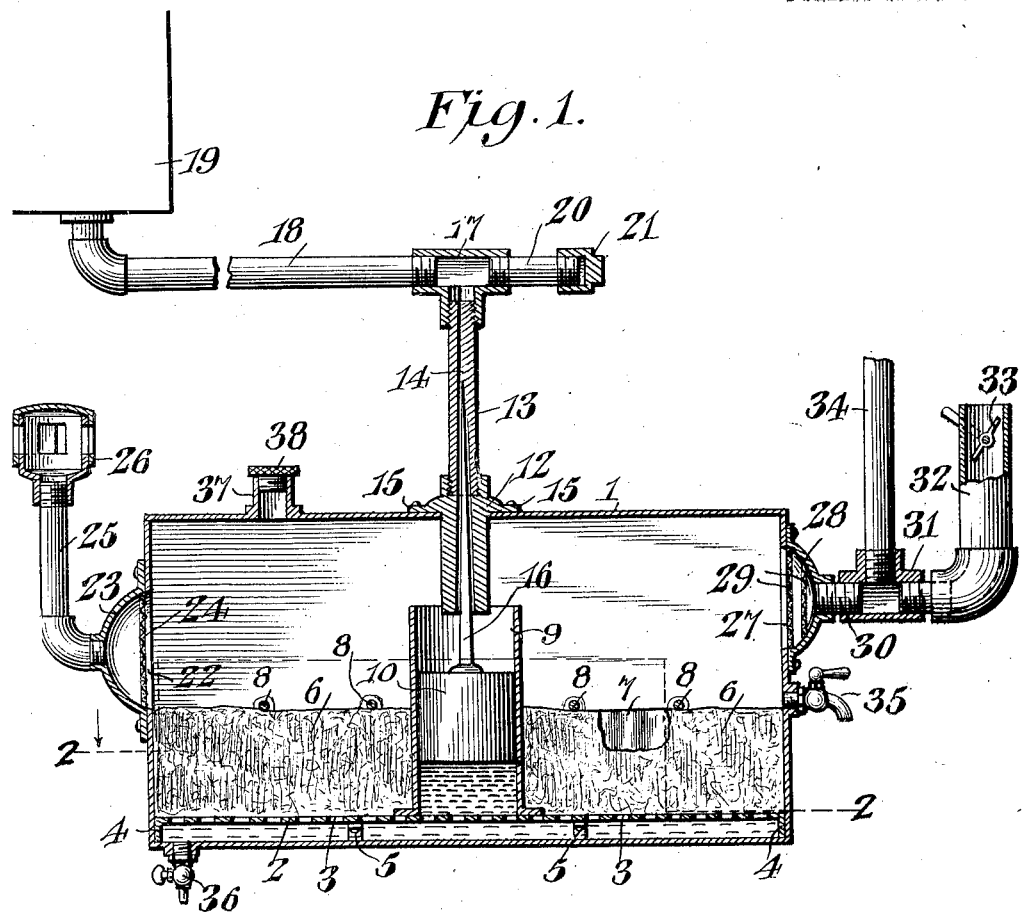
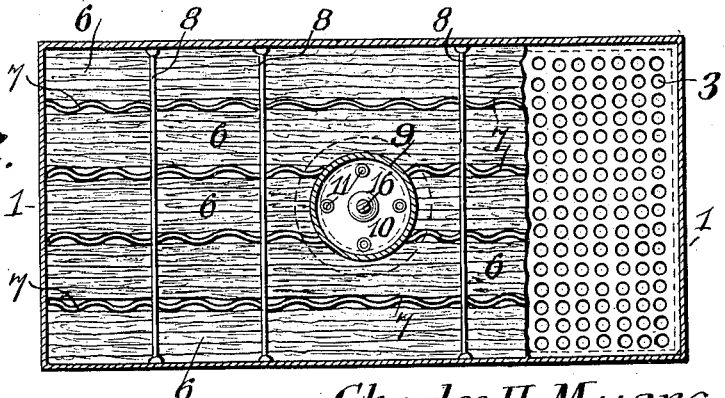
WITNESSES
Charles H. Myers, INVENTOR
BY
ATTORNEY

C. H. MYERS.
CARBURETER.
APPLICATION FILED MAR. 1, 1912.

1,093,718.

Patented Apr. 21, 1914.
2 SHEETS—SHEET 2.

Charles H. Myers, INVENTOR

WITNESSES

BY

ATTORNEY

UNITED STATES PATENT OFFICE.

CHARLES H. MYERS, OF BUFFALO, NEW YORK.

CARBURETER.

1,093,718.  Specification of Letters Patent.  Patented Apr. 21, 1914.

Application filed March 1, 1912. Serial No. 680,799.

*To all whom it may concern:*

Be it known that I, CHARLES H. MYERS, a citizen of the United States, residing at Buffalo, in the county of Erie and State of New York, have invented a new and useful Carbureter, of which the following is a specification.

This invention has reference to improvements in carbureters, and its object is to provide a means whereby air is charged with a volatile hydro-carbon to form an explosive mixture to be used particularly in internal combustion engines, although not necessarily confined to such use.

In accordance with the present invention there is provided a casing or container partly filled with absorbent material and within the mass of absorbent material there is provided a float chamber controlling an elongated needle valve working through an elongated valve seat introduced between the carbureter and a supply of hydro-carbon liquid. The absorbent material is so arranged as to be freely swept by air streams, the container being connected at one end to the atmosphere through controllable means, and at the other end with the engine or other device to be supplied with enriched air. The needle valve float is so arranged as to respond to varying levels of liquids within the carbureter, whereby a substantially constant level of liquid is maintained, and the absorbent material has at practically all times the same degree of saturation whereby the air traversing the carbureter will be brought into contact with a body of fluid from which the air may be equally charged under all conditions.

The invention will be best understood from a consideration of the following detailed description taken in connection with the accompanying drawings forming a part of this specification, with the further understanding that while the drawings show a practical form of the invention the latter is susceptible of other practical embodiments, wherefore the invention is not confined to any strict conformity with the showing of the drawings, but may be changed and modified within such degrees as do not mark a material change from the salient features of the invention.

Figure 3:
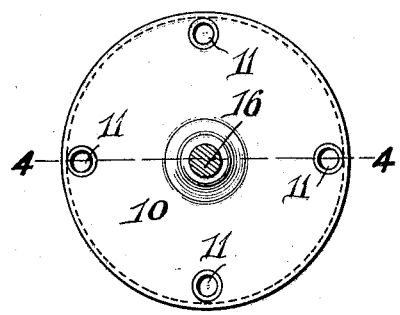
Figure 4:
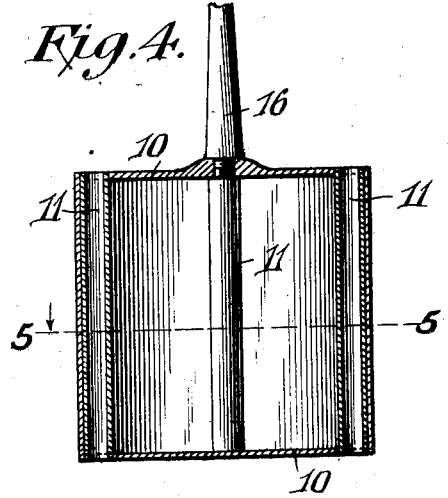
Figure 5:
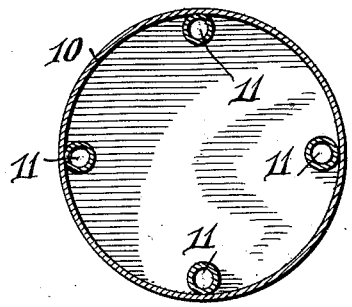
Figure 6:
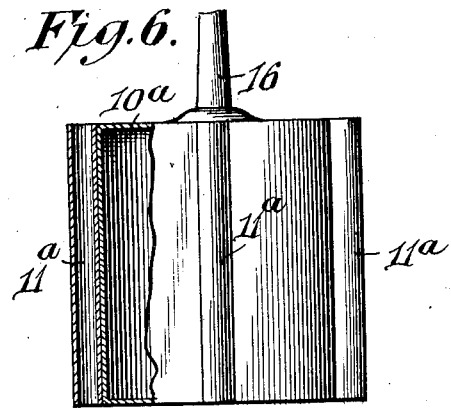
Figure 7:
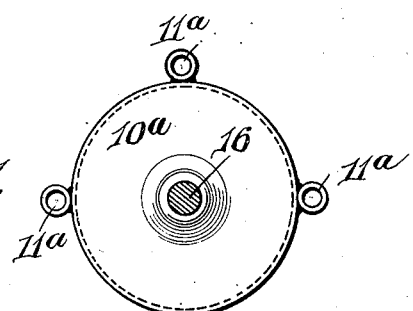

In the drawings: Figure 1 is a vertical longitudinal section of the carbureter structure with some parts shown in elevation. Fig. 2 is a section on the line 2—2 of Fig. 1. Fig. 3 is a plan view of one form of float with the needle valve in cross section. Fig. 4 is a section on the line 4—4 of Fig. 3 with some parts in elevation. Fig. 5 is a section on the line 5—5 of Fig. 4. Fig. 6 is an elevation of a modified form of the float with some parts in section. Fig. 7 is a plan view of the structure shown in Fig. 6 with the needle valve in cross section.

Referring to the drawings there is shown a casing 1 which is usually made rectangular in form, and is customarily longer than wide, although any particular shape is not mandatory, but the elongated form is to be preferred.

In the bottom portion of the interior of the casing there is lodged a plate 2 preferably provided with numerous perforations 3, but instead of the perforated plate any other plate-like structure may be employed whereby numerous passages through the plate are provided. In the particular instance, the plate 3 is formed with a marginal flange 4 supporting the plate a short distance above what constitutes the bottom of the casing 1 when in use, and at suitable intervals the plate is further supported by feet 5, so that it will maintain its spaced relation with reference to the bottom of the casing. The plate 2 has lodged thereon a closely packed mass of absorbent material 6, which is preferably in the form of wicking with the strands upright, so that the upper surface of the mass of wicking is formed by the ends of the strands, the latter being cut off transversely of their length. The wicking may be in long thin strips, and at intervals the strips are separated by corrugated perforated diaphragms 7 serving to hold the wicking in place and the perforations permitting free flow of liquid from one mass of wicking to the other. Overlying the wicking are rods 8 at suitable intervals to hold the mass of wicking or absorbent material, together with the diaphragms 7, to the perforated plate or false bottom 2.

In preferably central relation to the mass of wicking there is provided a tube 9 resting on and secured to the plate 2 at its lower end and projecting above the bottom of the wicking where it may be open. This tube 9 constitutes a float chamber, and lodged therein is a float 10 which may be in the form of a hollow closed structure snugly but freely fitting the tube 9, and when the latter is circular the float is cylindrical, but if the tube 9 be of other shape in cross section the shape of the float may conform thereto. Extending through the float and open at both ends are tubes 11 having no communication with the interior of the float, but permitting free flow of liquid from one end of the float to the other through the tubes. The float may be constructed as shown in Figs. 6 and 7, where there is illustrated a float body $10^a$ of smaller diameter than the tube 9, and carrying a peripheral series of tubes or rods $11^a$ acting as spacers for the float, whereby it is centralized in the tube 9. This leaves ample room for the flow of liquid about the float, and while some liquid may pass through the tubes $11^a$ they may as well be solid rods, so far as any necessity for the provision of the flow of liquid therethrough is concerned, but are made tubular for lightness.

The top of the casing 1 carries a fitting 12 into which may be screwed a pipe 13, although so far as function is concerned the fitting 12 and pipe 13 may be integral, one with the other. Extending axially through the fitting 12 and pipe 13 is a passage 14 tapering from the end of the fitting 12 remote from the pipe 13 to the end of the pipe 13 remote from the fitting 12, although, of course, the taper need not be as long as the combined length of the fitting 12 and pipe 13. The fitting 12 is provided with ears 15 by means of which the said fitting may be secured to the top of the casing 1 with the main portion of the fitting extending into the casing and into the upper open end of the pipe or float chamber 9. Mounted on the float 10 or $10^a$, as the case may be, is an elongated stem 16 tapered in accordance with the taper of the passage 14 and constituting a needle valve, which, when the float rises to a predetermined height closes the passage 14 and when the float drops opens said passage. The relation between the needle 16 and the passage 14 may be such that the space about the needle valve within the passage 14 is ultimately reduced until capillary, so that actual contact between the needle valve and the walls of the passage 14 is unnecessary to stop the flow of liquid, wherefore there is no liability of jamming the needle valve in its seat in the passage 14 to thereby interfere with the ready response of the float to lowering levels of liquid within the casing 1. This desirable condition is brought about by having the needle valve greatly elongated and the taper portion of the passage 14 correspondingly elongated, so that the extent of the passage when reduced to capillary cross section is sufficient to overcome the effect of the head of liquid tending to flow past the valve.

The pipe 13 carries a T fitting 17, one end of which is entered by a pipe 18 leading to a reservoir 19, which latter may be located at any convenient point, and at such a height that liquid therefrom will gravitate to the pipe 13. The reservoir 19 is made of sufficient capacity to supply the casing 1 with liquid for as long a period as may be desired without the necessity of replenishing the supply within the reservoir 19. The other end of the T 17 from that entered by the pipe 18 carries a short pipe 20 which may be closed by a cap 21, so that in case of necessity the cap 21 may be removed and the pipe 18 blown out.

At one end of the casing 1 there is an opening 22 covered by a cap 23, confining a gauze sheet 24 over said opening. The cap 23 at the end remote from the opening 22 receives one end of a pipe 25, which in turn carries a damper structure 26 of suitable form to admit air with more or less freedom to the pipe 25 in accordance with the will of an operator. The opening 22 is so arranged as to rise from about the level of the top of the absorbent material 6 and is several times the area of the pipe 25, so that air entering the cap member 23 by way of the pipe 25 will spread out and be distributed into many fine streams by the gauze 24, and will then further spread out within the casing 1 over substantially the whole exposed upper surface of the closely packed mass of fibrous material 6. At the other end of the casing from the opening 22 is another opening 27 located higher than the opening 22, and this opening 27 is covered by a cap member 28 outside the casing 1, this cap member containing gauze layers 29 shown as two in number spaced apart, but it will be understood that one gauze sheet may be employed instead of two. The cap member 28 is connected by a nipple 30 to a T coupling 31, which in turn is connected in line with a nipple 30 to a pipe 32 within which is lodged a valve 33 preferably of the butterfly type. Leading off from the coupling 31 is a pipe 34 which in the installed apparatus communicates with the explosion chamber of an engine, or with any other point of utilization of enriched air. The casing 1 is provided with a stop cock 35 at about the level of the top of the wicking 6, and leading from the bottom of the casing is a branch valve 36, while connected with the top of the casing is an inlet pipe 37 normally closed by a screw plug 38.

If it be assumed that the casing 1 contains no liquid, then liquid from within the reservoir 19 may be permitted to flow through the pipe 18 to the pipe 13, and there being no liquid within the casing 1 the float 10 or $10^a$ is in its lowermost position, wherefore the valve stem 16 is so far removed from the walls of the passage 14 as to leave free passage for liquid reaching the pipe 13, and this liquid thereupon flows into the float chamber 9 and through or about the float 10 or 10ª and from thence through the perforations of the plate 2 into the space between this plate and the bottom of the casing. Such liquid spreads out and as the level of liquid rises above the bottom of the plate 2, the liquid will find its way into the wicking 6 until the latter becomes thoroughly saturated and finally it will reach the top of the wicking and begin to flow off through the stop cock 35, which is assumed to be open. The initial filling may take place through the pipe 37 instead of in the manner stated. The rising level of liquid within the casing 1 causes a like movement of the float 10 until by the time the top of the wicking is reached the needle valve 16 has entered the pipe 13 to an extent to arrest further flow of liquid therethrough into the casing 1. Suppose, now, that the engine is put in operation, the suction stroke of the engine causes a condition of sub-atmospheric pressure in the pipe 34, which condition is communicated to the interior of the casing 1 in the space or compartment defined between the upper surface of the absorbent material and the top wall of the casing, this space being substantially unobstructed, and there is, of course, at once established a tendency to relieve this condition by the inflow of air through the damper 26 to the pipe 25 and from thence through the gauze 24 and passage 22, so that as the engine runs there are caused streams of air to move through the casing 1 in the space above the absorbent material, and these streams of air absorb the liquid presented at the upper ends of the fibers of the wicking or absorbent material, and because of the highly volatile nature of the liquid used the air becomes charged with the volatilized liquid and by the time the charged air reaches the gauzes 29 the mixture of air and volatilized hydro-carbon liquid is sufficiently intimate so that after passing through the gauzes 29 which separate the stream of charged air into many fine streams the mixture assumes the desired intimacy. The air so charged is too rich for use in an explosion engine, and, therefore, the mixture is diluted by air introduced into the pipe 32 past the valve 33.

The casing 1 is elongated in the direction of the flow of air therethrough, so that the air remains in contact with the wet exposed surface of the wicking for a considerable time, thereby giving ample opportunity for the charging of the air with volatilized hydro-carbon. The constant presentation of fresh supplies of air to the wicking within the interior of the casing 1 tends to deplete the wicking of liquid, and while the capillary attraction of the fibrous material causes a constant presentation of the liquid at the upper ends of the fibers of the wicking or fibrous material, the level of liquid within the float chamber 9 lowers until finally the float 10 or 10ª following such lowering level withdraws the valve 16 from the passage 14 until the latter is sufficiently open to permit the head of liquid in the reservoir 19 to overcome any holding back of the liquid due to capillary attraction and liquid from the reservoir 19 then passes through the pipe 13 and fitting 12 into the float chamber 9 to replenish the supply of liquids therein, and the float rises until the valve 16 again effectively closes the pipe 13, thus arresting further flow of liquid into the float chamber 9 until the level of liquid therein has again lowered. The variation in level within the float chamber 9 is small in practice, so that the actual level of liquid within the chamber 9 is such as to keep the fibrous material 6 thoroughly wet and to maintain at the upper ends of the fibers a quantity of hydro-carbon liquid ample to supply the needs of the engine.

Having once adjusted the device it remains to a large extent automatic in action, although the varying atmospheric and other conditions may necessitate some adjustment of the dampers 26 and 33. It is to be observed that the float chamber 9 is preferably located about midway of the length and breadth of the casing 1 so that liquid entering the chamber is readily distributed to the lower edges of the wicking.

The device of the present invention is well adapted for explosion engines whether of the stationary type or mounted on vehicles, and since there is no free liquid within the casing 1 that can splash about, the shocks and jars to which the device is subjected upon a vehicle like an automobile has no detrimental effect whatsoever to the action of the device.

What is claimed is:—

1. A structure for the purpose described, comprising a casing, a float chamber within the casing, a closely packed mass of fibrous absorbent material surrounding the float chamber and extending therefrom to the inner walls of the casing and stopping short of the top of the casing to define a chamber between the top of the casing and the top of the mass of absorbent material, inlet and outlet means for the casing communicating with the last-named chamber, a float within the float chamber, a valve carried by the float, and a supply duct leading from the exterior of the casing into the float chamber and provided with a seat for the valve.

2. A structure for the purpose described, comprising a casing with a closely packed mass of fibrous material therein having upright strands with their upper ends forming the upper surface of the mass, and said mass of absorbent material being located within the casing in spaced relation to and above the bottom of the latter and stopping short of the top of the casing to define a chamber between the top of the mass and the top of the casing, a float chamber within the casing communicating with the space below the absorbent material and extending upwardly through and above said absorbent material, a float within the float chamber, a valve carried by the float, a supply duct leading from the exterior of the casing into the float chamber and provided with a seat for the valve, and inlet and outlet means for the chamber above the absorbent material.

3. A device for the purpose described, comprising a casing having a pervious false bottom in elevated relation to the bottom of the casing, absorbent material lodged on the false bottom, and defining a substantially unobstructed space or chamber between its upper surface and the top of the casing, a float chamber within the casing communicating with the space between the false bottom and the bottom of the casing, a duct leading from the exterior of the casing downwardly into the float chamber and provided with a valve seat, a float in said float chamber, a valve carried by the float in operative relation to the valve seat in the duct, an air inlet to the chamber above the fibrous material at one end of the casing, and an outlet for said last named chamber at the other end of the casing.

4. A device for the purpose described comprising a casing having a pervious false bottom in elevated relation to the bottom of the casing, absorbent material lodged on the false bottom, and defining a substantially unobstructed space or chamber between its upper surface and the top of the casing, a float chamber within the casing communicating with the space between the false bottom and the bottom of the casing, a duct leading from the exterior of the casing downwardly into the float chamber and provided with a valve seat, a float in said float chamber, a valve carried by the float in operative relation to the valve seat in the duct, an air inlet to the chamber above the fibrous material at one end of the casing, and an outlet for said last named chamber at the other end of the casing, the outlet being located at a higher point than the inlet.

5. In a device for the purpose described, a casing having a mass of fibrous material therein, and a support sustaining the fibrous material in spaced relation to and above the bottom of the casing, said fibrous material stopping short of the top of the casing, a float chamber extending through the fibrous material and communicating at the ends with the respective spaces above and below the fibrous material, a duct entering the chamber from the top and extending into the float chamber and also provided with an elongated tapering valve seat, a float within the float chamber, and an elongated tapering needle valve carried by the float and entering the duct in operative relation to the valve seat, the needle valve and its seat being elongated to an extent to define an elongated capillary space resistant to the passage of liquid before the valve needle engages its seat.

6. In a device for the purpose described, a casing provided with an air inlet and an outlet for enriched air, a mass of fibrous material within the casing in spaced relation to the bottom of the casing and stopping short of the top of the casing, the said inlet and said outlet to the casing communicating with the space above the fibrous material only, a float chamber extending through the fibrous material, a duct entering the casing and extending downwardly into the float chamber and provided with an elongated tapering valve seat, and a float in said float chamber carrying an elongated needle valve entering the duct into operative relation to the valve seat.

7. A device for the purpose described, comprising an elongated casing, a mass of fibrous absorbent material therein in spaced relation to the bottom of the casing, and stopping short of the top of said casing, a controllable air inlet means at one end of the casing opening into the space above the absorbent material, an outlet means at the other end of the casing communicating with the said space above the absorbent material and at a higher point than the inlet means, a float chamber within the casing rising through the absorbent material and to a point above the upper surface thereof, a duct leading into the casing and entering the float chamber through the upper end thereof and also provided with a valve seat, and a valve carried by the float and extending into the duct into operative relation to the valve seat.

8. A device for the purpose described, comprising an elongated casing, a mass of absorbent material therein in spaced relation to the bottom of the casing, and stopping short of the top of said casing, a controllable air inlet means at one end of the casing opening into the space above the absorbent material, an outlet means at the other end of the casing communicating with the said space above the absorbent material and at a higher point than the inlet means, a float chamber within the casing rising through the absorbent material and to a point above the upper surface thereof, a duct leading into the casing and entering the float chamber through the upper end thereof and also provided with a valve seat, and a valve carried by the float and extending into the duct into operative relation to the valve seat, the mass of absorbent material being in the form of wicking with its strands upright to present the ends of the strands at the upper surface.

In testimony, that I claim the foregoing as my own, I have hereto affixed my signature in the presence of two witnesses.

CHAS. H. MYERS.

Witnesses:
  JOHN H. SIGGERS,
  DAVID R. WAGNER.